US011726489B1

(12) United States Patent
Ebrahimi Afrouzi et al.

(10) Patent No.: US 11,726,489 B1
(45) Date of Patent: *Aug. 15, 2023

(54) ROBOTIC CLEANER

(71) Applicants: Ali Ebrahimi Afrouzi, Henderson, NV (US); Lukas Robinson, York (CA); Chen Zhang, Redmond, WA (US)

(72) Inventors: Ali Ebrahimi Afrouzi, Henderson, NV (US); Lukas Robinson, York (CA); Chen Zhang, Redmond, WA (US)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,665

(22) Filed: Mar. 29, 2022

Related U.S. Application Data

(63) Continuation of application No. 16/297,508, filed on Mar. 8, 2019, now Pat. No. 11,320,828.

(60) Provisional application No. 62/746,688, filed on Oct. 17, 2018, provisional application No. 62/655,494, filed on Apr. 10, 2018, provisional application No. 62/648,026, filed on Mar. 26, 2018, provisional application No. 62/640,444, filed on Mar. 8, 2018.

(51) Int. Cl.
G05D 1/02 (2020.01)
B25J 9/16 (2006.01)
G05D 1/00 (2006.01)
B25J 11/00 (2006.01)

(52) U.S. Cl.
CPC .......... G05D 1/0231 (2013.01); B25J 9/1664 (2013.01); B25J 9/1697 (2013.01); B25J 11/0085 (2013.01); G05D 1/0088 (2013.01); G05D 2201/0203 (2013.01)

(58) Field of Classification Search
CPC ............... G05D 1/0231; G05D 1/0088; G05D 2201/0203; B25J 9/1664; B25J 9/1697; B25J 11/0085
See application file for complete search history.

(56) References Cited

U.S. PATENT DOCUMENTS

| 10,427,306 B1 * | 10/2019 | Quinlan ................. B25J 11/008 |
| 11,399,687 B2 * | 8/2022 | Cheong ................. G05D 1/0088 |
| 2011/0202175 A1 * | 8/2011 | Romanov ........... A47L 11/4036 700/250 |
| 2018/0012080 A1 * | 1/2018 | Glaser ................. H04N 5/2252 |
| 2020/0241553 A1 * | 7/2020 | Knuth ................. G01C 21/3878 |
| 2020/0275814 A1 * | 9/2020 | Jo ........................ G05D 1/0274 |

* cited by examiner

Primary Examiner — Nicholas Kiswanto
Assistant Examiner — Jamal A Shah

(57) ABSTRACT

Provided is a tangible, non-transitory, machine readable medium storing instructions that when executed by one or more processors of a robotic device effectuate operations including capturing, with a camera of the robotic device, spatial data of surroundings of the robotic device; generating, with the one or more processors of the robotic device, a movement path based on the spatial data of the surroundings; capturing, with at least one sensor of the robotic device, at least one measurement relative to the surroundings of the robotic device; obtaining, with the one or more processors of the robotic device, the at least one measurement; and inferring, with the one or more processors of the robotic device, a location of the robotic device based on the at least one measurement.

20 Claims, 9 Drawing Sheets

ROBOTIC CLEANER

CROSS-REFERENCE TO RELATED APPLICATIONS

This application is a Continuation of Non-Provisional patent application Ser. No. 16/297,508, filed Mar. 8, 2019, which claims the benefit of Provisional Patent Application Nos. 62/640,444, filed Mar. 8, 2018, 62/648,026, filed Mar. 26, 2018, 62/655,494, filed Apr. 10, 2018, and 62/746,688, filed Oct. 17, 2018, each of which is hereby incorporated by reference.

In this patent, certain U.S. patents, U.S. patent applications, or other materials (e.g., articles) have been incorporated by reference. Specifically, U.S. patent application Ser. Nos. 16/048,179, 16/048,185, 16/163,541, 16/163,562, 16/163,508, 16/185,000, 62/681,965, 62/614,449, 16/041,286, 15/406,890, 14/673,633, 16/163,530, 15/954,410, 14/817,952, 16/198,393, 62/590,205, 62/740,558, 16/239,410, and 16/230,805 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present disclosure relates to robotic cleaners for commercial and residential areas.

BACKGROUND

Autonomous robotic cleaners are increasingly used in commercial and residential establishments. Robotic cleaners can operate autonomously by generating a map of the environment for navigating, avoiding obstacles while performing work, and for planning a movement path. Robotic cleaners localize themselves within the environment to locate their position within the map of the environment. For a robotic cleaner to function autonomously, it must be able of re-finding its location in the environment after making an uncertain move in the environment. It must have a sense of its location within its surroundings to execute tasks on its own, particularly to avoid repetitive tasks that have already been completed. For example, cleaning an area that has already been cleaned.

Different techniques for localization have been used. For example, tracking and local localization techniques have been used that require knowledge of the initial location of the robotic cleaner and also require continuous tracking of the movement of the robotic cleaner. These techniques are undesirable as the initial position of the robotic cleaner must be known and if the system loses track of the robotic cleaner at some point in time, the system typically cannot recover and re-localize the robotic cleaner. Global localization techniques have also been used, with Markov localization being a prominent approach. Markov localization in particular uses a probabilistic framework, wherein a probability density over all possible robotic cleaner states (or positions) is maintained throughout navigation. Initially, the location of the robotic cleaner is represented by a uniform distribution if the location of the robotic cleaner is unknown or by a Gaussian distribution if the location of the robotic cleaner is known with high certainty. With Markov localization, the sensor data is processed to detect the presence of landmarks, which are then used for localizing the robotic cleaner. If data does not contain any landmarks, localization is prone to failure. Furthermore, there is an assumption that the environment of the robotic cleaner is static, wherein the location of the robotic cleaner is the only state in the environment. For this reason, the localization technique is prone to fail in highly dynamic environments where sensors may be blocked from observing particular landmarks for extended periods of time. In implementation of Markov localization, a common approach for representation of the probability distribution over the state space is based on Kalman filtering, which assumes the position of the robotic cleaner to be modeled by an unimodal Gaussian distribution. This hinders the position of the robotic cleaner from being represented by a multimodal distribution.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a tangible, non-transitory, machine readable medium storing instructions that when executed by one or more processors of a robotic device effectuate operations including: capturing, with a camera of the robotic device, spatial data of surroundings of the robotic device; generating, with the one or more processors of the robotic device, a movement path based on the spatial data of the surroundings; capturing, with at least one sensor of the robotic device, at least one measurement relative to the surroundings of the robotic device; obtaining, with the one or more processors of the robotic device, the at least one measurement; and inferring, with the one or more processors of the robotic device, a location of the robotic device based on the at least one measurement.

Included is a method including the above described process.

Provided is a robotic device, including: a chassis; a set of wheels; one or more motors to drive the set of wheels; a controller in communication with the one or more motors; one or more surface cleaning tools; at least one sensor; a camera; one or more processors; a tangible, non-transitory, machine readable medium storing instructions that when executed by the one or more processors of a robotic device effectuate operations including: capturing, with the camera, spatial data of surroundings of the robotic device; generating, with the one or more processors, a movement path based on the spatial data of the surroundings; capturing, with the at least one sensor, at least one measurement relative to the surroundings of the robotic device; obtaining, with the one or more processors, the at least one measurement; inferring, with the one or more processors, a location of the robotic device based on the at least one measurement; inferring, with the one or more processors, characteristics of the surroundings based on sensor data captured by sensors of the robotic device, wherein: the characteristics comprise at least debris accumulation, floor type, and time of user activity; and the sensed data is associated with location data of the robotic device indicating a location of the robotic device at the time the sensor data was captured; determining, with the one or more processors, a schedule of the robotic device based on the time of user activity inferred; and determining, with the one or more processors, locations to operate a cleaning tool based on the floor type of locations within the surroundings.

DETAILED DESCRIPTION OF SOME EMBODIMENTS

Figure 1A:
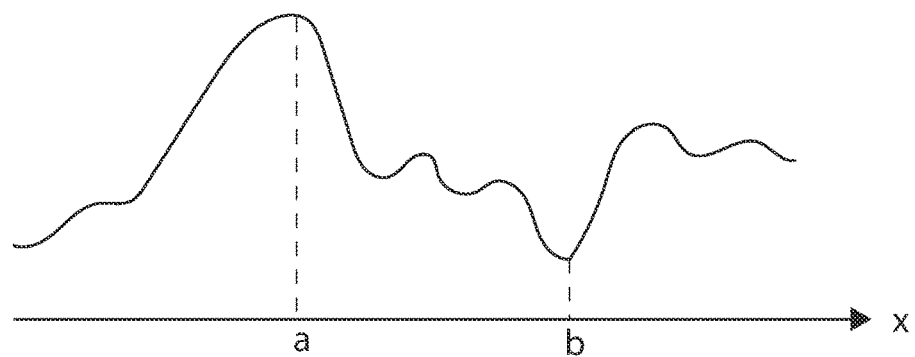
FIGS. 1A-1C illustrate an embodiment of the localization process of a robotic cleaner for commercial establishments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

In some embodiments, a robotic cleaner for commercial or residential establishments may include one or more autonomous or semi-autonomous devices having communication, an actuator, mobility, and/or processing elements. The robotic cleaner may, but is not required to include (which is not to suggest that any other described feature is required in all embodiments), a casing (like a shell), a chassis, a transport drive system such as wheels or other mobility device, a motor to drive the wheels or other mobility device, one or more cleaning tools, a receiver that acquires signals transmitted from, for example, a transmitting beacon, a processor, a controller, memory, network or wireless communications, power management, etc., and one or more clock or synchronizing devices. The robotic cleaner may also include a power module for delivering (and in some cases storing) electrical power and a sensor module for observing the environment and for sending commands based on the observed environment. The sensor module may include sensors for detecting obstacles, types of flooring, cliffs, system status, temperature, and the like or sensors for measuring movement. An interface module may also be included to provide an interface between the robotic cleaner and a user. The robotic cleaner may further include IR sensors, tactile sensors, sonar sensors, gyroscopes, ultrasonic range finder sensors, depth sensing cameras, odometer sensors, optical flow sensors, LIDAR, LADAR, cameras, IR illuminator, remote controls, Wi-Fi capability, network card, Bluetooth capability, cellular functionality, USB ports and RF transmitter/receiver. Other types of robots or robotic cleaners with other configurations may also be used and implement the techniques described herein.

In some embodiments, the processor of the robotic cleaner generates a map of the environment, while in other embodiments, the map is provided in the memory of the robotic cleaner. For example, in some embodiments, the processor discovers and plots the perimeter of the environment by combining readings taken within successively overlapping fields of view using a camera. In some embodiments, an image processor (e.g., an on-board image processor) processes the captured images. In some embodiments, distance measurements are taken within successively overlapping fields of view using the camera as the robotic cleaner moves within the environment and overlapping distance measurements are combined by the processor to plot the perimeter of the environment. In some embodiments, the processor compares the distance measurements taken within consecutive fields of view to find the overlapping area between successive images. In some embodiments, the processor determines an area of overlap between two fields of view when a number of consecutive measurements from a first field of view and a second field of view are similar. In some embodiments, the area of overlap between distance measurements taken within two fields of view is estimated based on the measured movement of the robotic cleaner and is used as a method of verifying the identified area of overlap. It may also be used as the primary method of identifying the area of overlap. In some embodiments, devices such as an odometer, gyroscope, and optical flow sensor are used to measure movement. For example, the angular displacement provided by an odometer and gyroscope and/or the mathematical convolution of the two are used to estimate the area of overlap. In some embodiments, the processor identifies gaps in the plotted perimeter and further explores the identified gaps, directing the camera until a complete (or more complete) closed loop perimeter of the environment is plotted. In some embodiments, the robotic cleaner starts working in the discovered environment while trying to discover new areas. Detailed examples of methods for creating a map of an environment are described in U.S. patent application Ser. Nos. 16/048,179, 16/048,185, 16/163,541, 16/163,562, 16/163,508, 16/185,000, 62/614, 449, and 62/681,965, the entire contents of which are hereby incorporated by reference.

In some embodiments, the robotic cleaner autonomously cleans a commercial establishment using one or more cleaning tools, such as two large circular brushes, a UV sterilizer, or a mop. In some embodiments, the processor determines which cleaning tools to use based on characteristics of the environment using methods such as those described in U.S. patent application Ser. Nos. 16/239,410 and 16/163,530, the entire contents of which are hereby incorporated by reference. For example, in some embodiments, the robotic cleaner uses the processor and one or more environmental sensors (e.g., sensors that sense attributes or can observe or provide data from which inferences can be made about characteristics of an environment, such as those of a floor, a wall, or a surface of an obstacle). Examples of sensors include, but are not limited to, floor sensors, debris sensors, obstacle sensors, cliff sensors, acoustic sensors, cameras, optical sensors, distance sensors, motion sensors, tactile sensors, electrical current sensors, and the like. Sensors may sense various attributes of one or more of these features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment and the processor obtains the sensor data. In some embodiments, the sensed data is associated with location data of the robotic cleaner indicating the location of the robotic cleaner at the time the sensor data was obtained. In some embodiments, the processor infers environmental characteristics from the sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, etc.) based on the environmental characteristics inferred. In some embodiments, the processor activates or deactivates (or modulates intensity of) functions (e.g., vacuuming, mopping, UV, etc.) based on the environmental characteristics inferred. In other instances, the processor adjusts a cleaning path, operational schedule (e.g., time when various designated areas are worked upon, such as when cleaned), and the like based on sensory data. Examples of environmental characteristics include floor type, obstacle density, room type, level of debris accumulation, level of user activity, time of user activity, etc.

In some embodiments, the processor of the robotic cleaner determines a movement path of the robotic cleaner based on the map of the commercial establishment. For example, in some embodiments, the robotic cleaner is configured to implement a path planning method that is responsive to stimulus from an observed environment using the processor of the robotic cleaner. Some embodiments segment a working environment into regions and then dynamically adjust a coverage pattern within each of those regions abased on sensed attributes of the environment. In some embodiments, a topological graph represents the route plan of the robotic cleaner and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robotic cleaner as it follows along edges linked at vertices. While executing the movement path, in some embodiments, rewards may be assigned as the robotic cleaner takes actions to transition between states and uses the net cumulative reward to evaluate a particular movement path comprised of actions and states. The processor may iteratively calculate a state-action value function during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor of the robotic cleaner iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the working environment. Detailed examples of path planning methods are described in U.S. patent application Ser. Nos. 16/041,286, 15/406,890, and 14/673,633, the entire contents of which are hereby incorporated by reference.

In some embodiments, the processor divides the environment into subareas and orders them for cleaning to improve cleaning efficiency. In some embodiments, the robotic cleaner finishes cleaning in one subarea before cleaning another subarea. For example, in some embodiments, the processor divides the map into a plurality of cells wherein each cell corresponds to an area of the environment. In some embodiments, the processor segments the map into a plurality of zones, each zone having a subset of the plurality of cells. In some embodiments, the processor determines a sequence of the zones among a plurality of candidate sequences based on an effect of the sequence on a cost of a cost function that is based on travel distance of the robotic cleaner through the sequence. In some embodiments, the robotic cleaner traverses the zones in the determined sequence. In some embodiments, the cost function is based on other variables, such as actual surface coverage, repeat coverage, and total coverage time. Detailed examples of methods for dividing an environment into subareas are described in U.S. patent application Ser. Nos. 14/817,952, 16/198,393, 62/590,205, and 62/740,558, the entire contents of which are hereby incorporated by reference.

In some embodiments, the processor localizes the robotic cleaner. In some embodiments, methods of localization are inherently independent from mapping and path planning but may be used in tandem with any mapping or path planning method or may be used independently to localize the robotic cleaner irrespective of the path or map of the environment. In some embodiments, the motion of the robotic cleaner is described mathematically by Newton's motion equation:

$$F = m\frac{d^2x}{dt^2}$$

where F is the force causing the robotic cleaner to move, m is the mass of the robotic cleaner, x is the position of the robotic cleaner, t is time and d signifies the derivative. In some embodiments, the motion of the robotic cleaner is also described by:

$$F = -\frac{\partial V}{\partial x}$$

where V is potential energy causing motion of the robotic cleaner and ∂ signifies a partial derivative. In some embodiments, the two equations describing the motion of the robotic cleaner are combined to form a motion function that is used to determine the position of the robotic cleaner at a given time.

$$m\frac{d^2x}{dt^2} = -\frac{\partial V}{\partial x}$$

The above equation is in accordance with Newton's Second Law. Given the position of the mass at any given time x(t), the velocity $$\left(v = \frac{dx}{dt}\right),$$

momentum (p=mv), kinetic energy $$\left(T = \frac{1}{2}mv^2\right)$$

among other dynamic variables can be determined. Given the initial state variables, i.e. the position $x(t_0)$ and velocity $x'(t_0)$ of a particle, the trajectory of the particle can be calculated. Using the initial position and velocity, the position x at a later time $(t_0+\Delta t)$ is calculated using the equation below. The equation holds true if the velocity is constant in the time interval $[t_0, t_0+\Delta t]$, otherwise it is an approximation.

$$x(t_0+\Delta t)=x(t_0)+x'(t_0)\Delta t$$

In some embodiments, this process is iteratively repeated to calculate the trajectory at time $(t_0+2\Delta t)$ and so on. With the motion function being second order in time, $x(t_0)$ and $x'(t_0)$, are required to specify a trajectory. This is equivalent to identifying two space-time points $(x_i, t_i)$ and $(x_f, t_f)$.

Rather than consider a single position x, a processor of the robotic cleaner generalizes to n-dimensions $(x_1, x_2, \ldots, x_n)$ such that the spatial configuration of the system is represented as a point in an n-dimensional configuration space, otherwise known as a Hilbert Space. In some embodiments, the processor generalizes the motion equation:

$$m_j\frac{d^2x_j}{dt^2} = -\frac{\partial V}{\partial x_j}$$

In some embodiments, the processor integrates the motion equation to determine the trajectory of the robotic cleaner. Since the trajectory equation applies for all possible paths, a function dependent on not only the position x at time t but also on the path is required. In practice, the robotic cleaner may take any possible path. In some embodiments, the processor uses the Lagrangian function to predict such trajectory as it is a function of position, velocity, and time, and equal to the difference in kinetic energy and potential energy. In some embodiments, the processor defines an action S[x(t)] for each path from $(x_i, t_i)$ to $(x_f, t_f)$,:

$$S[x(t)] = \int_{t_i}^{t_f} L(x_i, x_f) dt$$

In some embodiments, the processor represents all possible locations resulting from possible actions S (or paths) or the action space by a field $|\Psi(x, t)|^2$.

By definition, a field is a physical quantity represented by a number or tensor that has a value for each point in space and time. For example, the surface wind velocity on a weather map can be considered a field since a vector describing the speed and direction of the movement of air is assigned to each point on the map for each time point t. In another example, surface temperature on the planet can be considered a field as a surface temperature exists for each point on the planet at a given time. In the case of the robotic cleaner, the field $|\Psi(x, t)|^2$ describes the likelihood of possible locations of the robotic cleaner at time t in some embodiments. This is shown in FIG. 1A, where possible locations of the robotic cleaner in a one-dimensional space are illustrated. As can be seen in this example, the robotic cleaner is more likely to be at a location x=a with a higher peak than at a location x=b. The illustration provided is one-dimensional for simplicity.

Given that the field $|\Psi(x, t)|^2$ describes the likelihood of possible locations of the robotic cleaner at time t, in some embodiments, the processor determines the likelihood of the location of the robotic cleaner being between two points a and b at a time t using the integral of $|\Psi(x, t)|^2$ from a to b.

$$\int_a^b |\Psi(x, t)|^2 dx$$

Figure 1B:
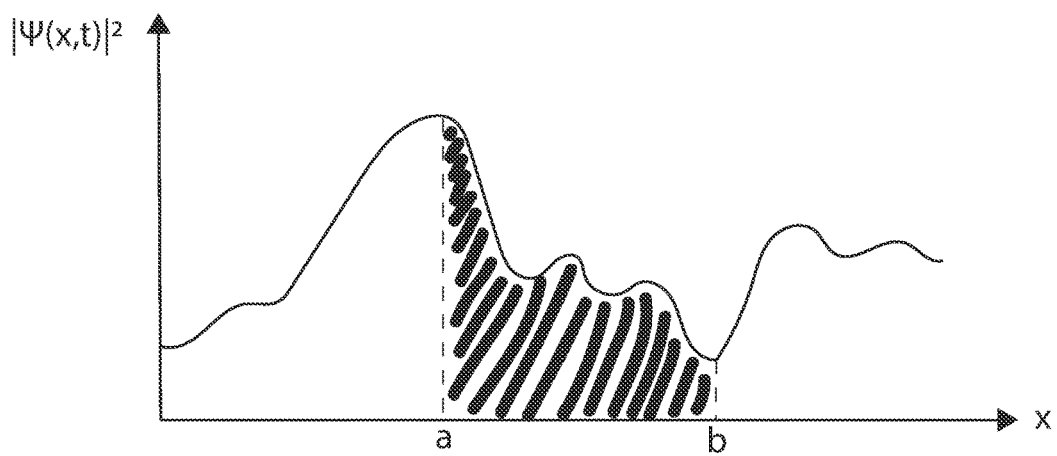

This integral is the area under the curve as shown in FIG. 1B.

In some embodiments, the processor normalizes the function $|\Psi(x, t)|^2$ by multiplying by a value $c=1/\sqrt{A}$, where A is a potential value other than 1. By normalizing, the above integral becomes equal to unity.

$$\int_a^b |\Psi(x, t)|^2 dx = 1$$

In some embodiments, the integral above represents the probability of x having a value between a and b at a given time t since the area bound in the integral summates to 1. In some embodiments, the normalized function $|\Psi(x, t)|^2$ represents a probability density function (PDF) and the processor determines the probability of the robotic cleaner being located at a particular location by determining the integral of the PDF.

$$\int_a^b |\Psi(x, t)|^2 dx = P(a < x < b, t)$$

Since $|\Psi(x, t)|^2$ is a linear differential equation that can be normalized, the processor can determine the expectation of the location x of the robotic cleaner in some embodiments.

$$<x> = \int_{-\infty}^{\infty} x|\Psi(x, t)|^2 dx$$

Additionally, since $$v = \frac{dx}{dt},$$

the processor can calculate the expected value of velocity of the robotic cleaner in some embodiments, where v is velocity.

$$<v> = \frac{d<x>}{dt} = \frac{d}{dt}\int_{-\infty}^{\infty} x|\Psi(x,t)|^2 dx$$

In some embodiments, the localization process begins by taking measurements of the surroundings using one or more sensors of the robotic cleaner, which include objects, obstacles, and perimeters among other materials and substances. Measurements may be of various forms. For example, measurements may be visual measurements captured by an image sensor, distance measurements taken by a distance sensor, time-of-flight measurements taken by a time-of-flight camera, WI-FI signal strength measurements taken by a WI-FI module or decibel measurements observed by an acoustic sensor. Other types of measurements may also be used. Different types of measurements may be used independently or simultaneously for localization purposes. In some embodiments, when a measurement is taken by at least one sensor of the robotic cleaner, the processor infers a position x of the robotic cleaner in a global coordinate system at time t of the measurement, thereby localizing the robotic cleaner. In some embodiments, the location is represented by $x=(x, y, \theta)$ in two dimensions, and in three dimensions the location is represented by $x=(x, y, z)$ and $\theta=(R_x, R_y, R_z)$ where R is a rotation matrix.

Regardless of the method used for localization and the type of sensor or measurement device, in some embodiments, localization of the robotic cleaner occurs at the time of measurement and is represented by a position x with respect to the surroundings, such as objects, obstacles or perimeters within the surroundings. For example, if a measurement device of the robotic cleaner measures distance to an object, the instant the measurement is taken the processor, for example, localizes the robotic cleaner to be at some position x with respect to the object measured. If the measurement device measures noise in decibels, for instance, the processor localizes the robotic cleaner as being at some position x from the originator of the noise. If the measurement device measures WI-FI strength, by way of further example, the processor localizes the robotic cleaner as being at some position x from the originating point of the WI-FI signal.

In some embodiments, the processor of the robotic cleaner may receive, send, and process data and commands, such as operation modes. The processor may perform, for example, methods for receiving, storing, and sending data; methods for processing data, including depth data and visual data; methods for processing command responses to received, stored or processed data, to the observed environment, to internal observation, or to user input; and methods for navigation and other operation modes. For example, the processor may receive data from an obstacle sensor and after processing the data received may respond by commanding the robotic cleaner to move in a specific direction. In some embodiments, the robotic cleaner includes a localization module for localizing the robotic cleaner. In some embodiments, the localization module includes, but is not limited to include, memory for storing data, a processor for receiving, sending, and processing data and commands, such as operation modes and an interfacing unit to interface with other components of the robotic cleaner, such as mapping or path planning modules. The localization module may be a part of the robotic cleaner or any other device or module of the robotic cleaner or may be a standalone system. The localization module may also include a separate component coupled to the robotic cleaner, the navigation system, the mapping module, the camera, or other devices working in conjunction with the robotic cleaner.

Figure 1C:
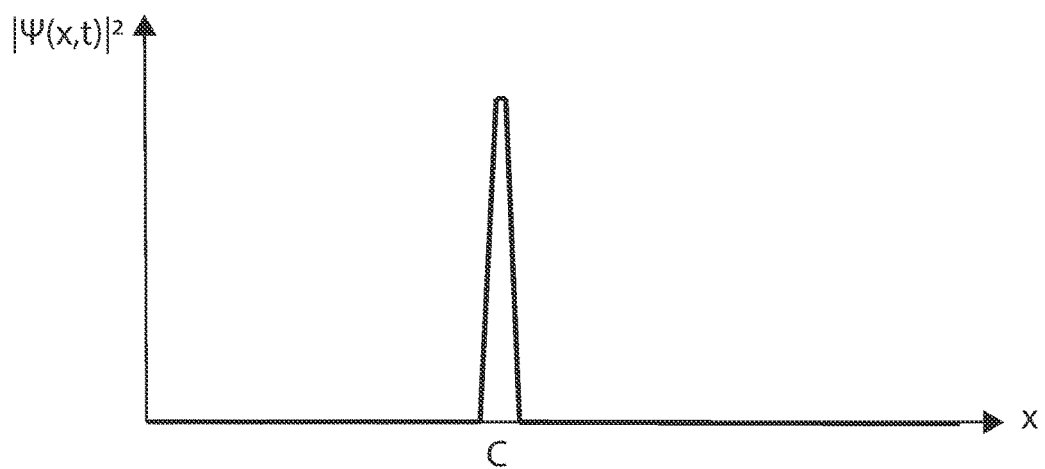
Figure 2:
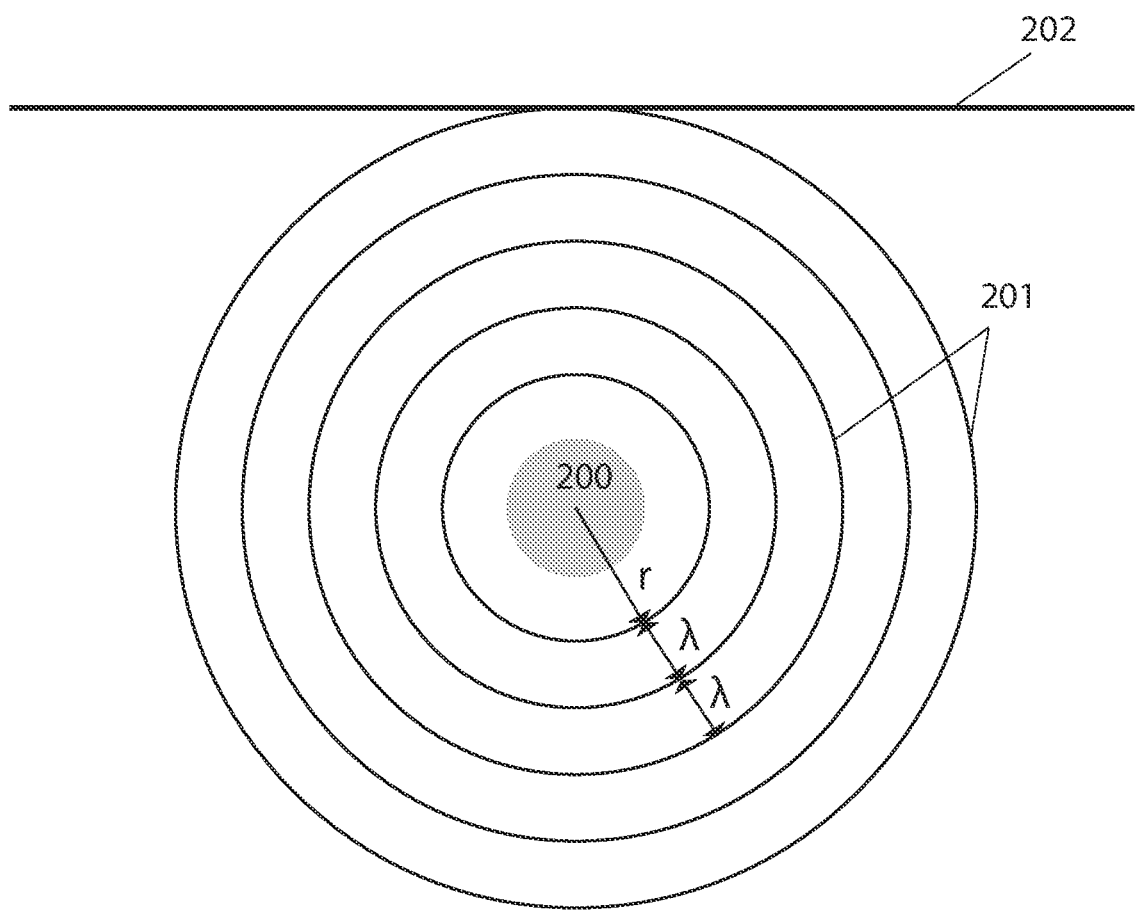
FIG. 2 illustrates an embodiment wherein at least one sensory device of a robotic cleaner takes measurements.

In some embodiments, the measurement process for localization is similar to a wave propagation, as shown in FIG. 2. The immediate surroundings of robotic cleaner 200 are initially observed using at least one measurement device for objects, obstacles, and perimeters followed by further distances into the surroundings as waves 201 propagate to reach perimeter 202. The search radius r of each propagating wave increases by a value $\lambda$. When the processor of the robotic cleaner detects an object, obstacle, or perimeter in a measurement captured by the at least one measurement device of the robotic cleaner, the processor obtains a value that can be used to account for localization, at this instant, the probability density function collapses to a Dirac Delta function with a spike at some value C for the location x of the robotic cleaner, as shown in FIG. 1C. The spike at some value C localizes the robotic cleaner as being at location C at that instant. If other measurements are taken at that instant, the spike at some value C for the location x is confirmed but after that instant and with movement of the robotic cleaner, the processor reverts the function back to being spread over possible values of x, as shown in FIGS. 1A and 1B for example.

In some embodiments, $\lambda$ is the localization resolution. For example, the processor uses multiples of $\lambda$ to describe the placement of the sensor against the environment. In some embodiments, the resolution of measurement is not the same as the localization resolution; therefore, the processors casts the measurement into a possible location of the robotic cleaner in multiples of $\lambda$. In some embodiments, the processor uses a probabilistic value to describe the likelihood of what multiple of $\lambda$ to interpret the localization measurement to. In some embodiments, the processor determines the probabilistic value as the logit function:

$$\text{logit}(P(x)) = \log\frac{P(x)}{1-P(x)}$$

wherein P(x) is the probability of x and $$\frac{P(x)}{1-P(x)}$$

is the odds of x being true. In this case x is a multiple of lambda.

Figure 3:
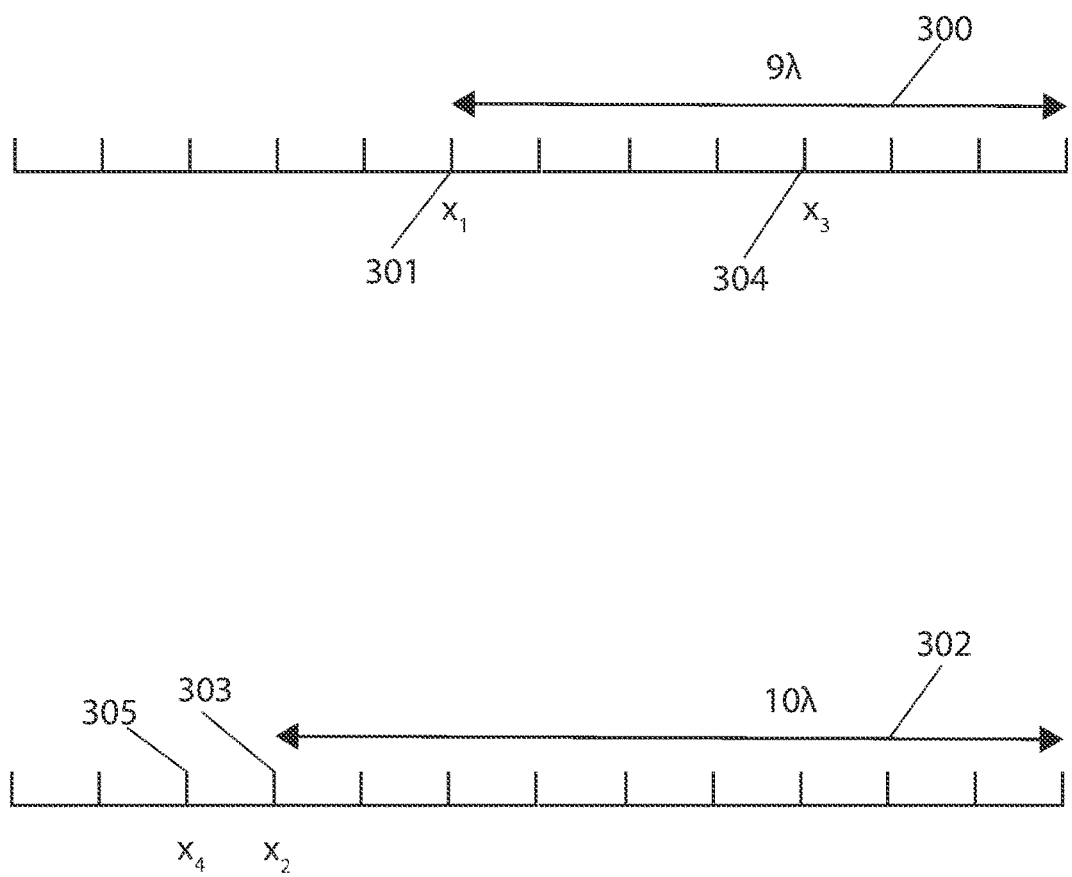
FIG. 3 illustrates an embodiment of alternative localization scenarios wherein localization is given in multiples of $\lambda$.
Figure 4:
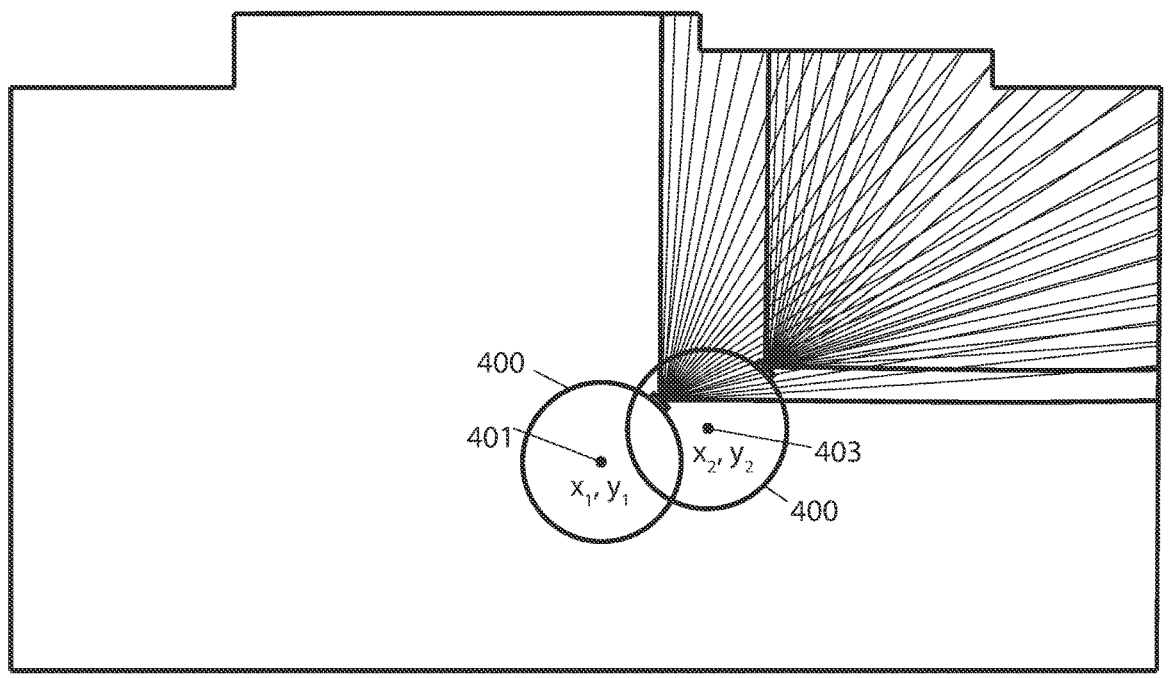
FIG. 4 illustrates an embodiment of maps of a robotic cleaner for alternative localization scenarios.
Figure 4:
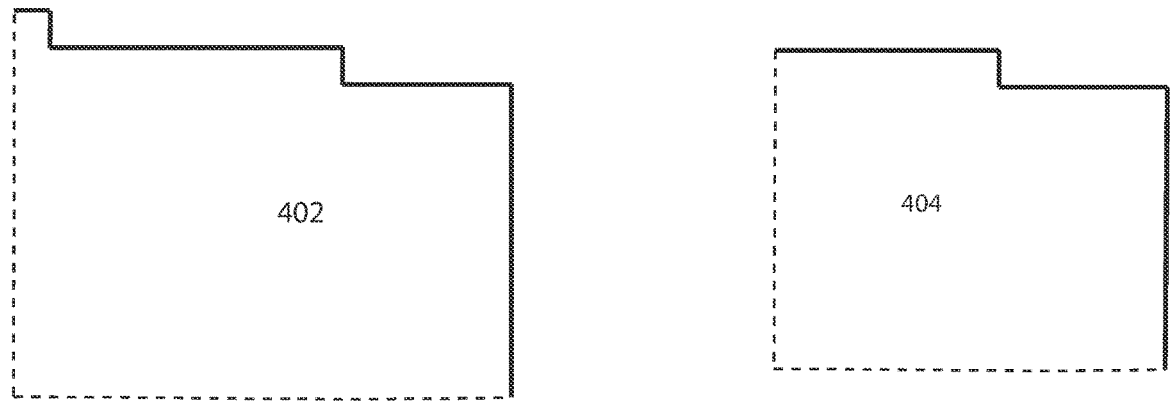

In some embodiments, the processor retains interpretations of the localization of the robotic cleaner having lower probabilistic values, despite higher probabilistic values being indicative of a better interpretation of the localization of the robotic cleaner. This is important as the robotic cleaner may be localized differently for different multiples of $\lambda$. and different localization results in a different map. For example, in FIG. 3 the processor uses a one-dimensional camera reading 300 of 9 $\lambda$ to localize the robotic cleaner at location 301 with value $x_1$ while a camera reading 302 of 10 $\lambda$ is used to localize the robotic cleaner at location 303 with value $x_2$. Since both readings localize the robotic cleaner to different locations, each reading may result in a different map. For example, robotic cleaner 400 in FIG. 4 localized at location 401 with value $x_1$, $y_1$ may result in map 402 while robotic cleaner 400 localized at location 403 with value $x_2$, $y_2$ may result in different map 404 with perimeters of the map plotted closer to robotic cleaner 400 as robotic cleaner 400 is localized to different location 403. In some embodiments, each location may be possible and alternative scenarios may be evaluated by the processor. In some embodiments, the number of alternative scenarios to evaluate may be predetermined or the processor selects the alternative scenarios to evaluate in real-time. For example, in discussing FIG. 3 above, the processor evaluates two possible scenarios, one where the robotic cleaner is localized at location 301 with value $x_1$ and another where the robotic cleaner is localized at location 303 with value $x_2$. However, other scenarios, such as localization of the robotic cleaner at locations 304 and 305 with values $x_3$ and $x_4$, respectively, may be evaluated by the processor as well. In some embodiments, the processor uses more than one dimension for localization. However, as the number of dimensions used increases, the number of alternative scenarios does as well, and localization can become computationally expensive. In some embodiments with low resolution and low dimensionality, the processor monitors 4 to 30 alternatives for example. In some embodiments where the resolution is higher, a higher number of alternative scenarios may be required. In some embodiments, the processor monitors, for example, between 35 to 200 alternative scenarios. In some embodiments, the processor uses an adaptive algorithm to increase and decrease the number of alternative scenarios as needed. In some embodiments, the processor replaces alternative scenarios monitored by other alternatives through a process of fitness proportionate selection wherein the processor uses a fitness function to assign a fitness to possible alternative scenarios. In some embodiments, the fitness level is used to associate a probability of selection with each alternative scenario. In some embodiments, the processor determined the fitness function using:

$$p_i = \frac{f_i}{\sum_{j=1}^{N} f_j}$$

wherein $f_1$ is the fitness of alternative scenario i of N possible scenarios and $p_i$ is the probability of selection of alternative scenario i. In some embodiments, the processor is less likely to eliminate alternative scenarios with higher fitness level from the alternative scenarios currently monitored.

Figure 5A:
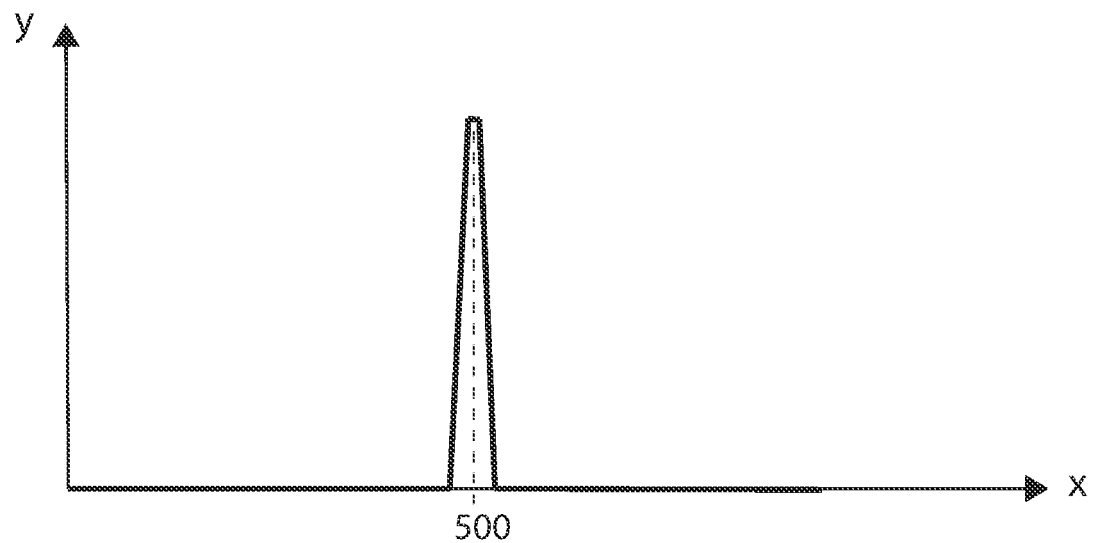
FIGS. 5A and 5B illustrate an embodiment of the use of multiple sensory devices for localization of a robotic cleaner.
Figure 5B:
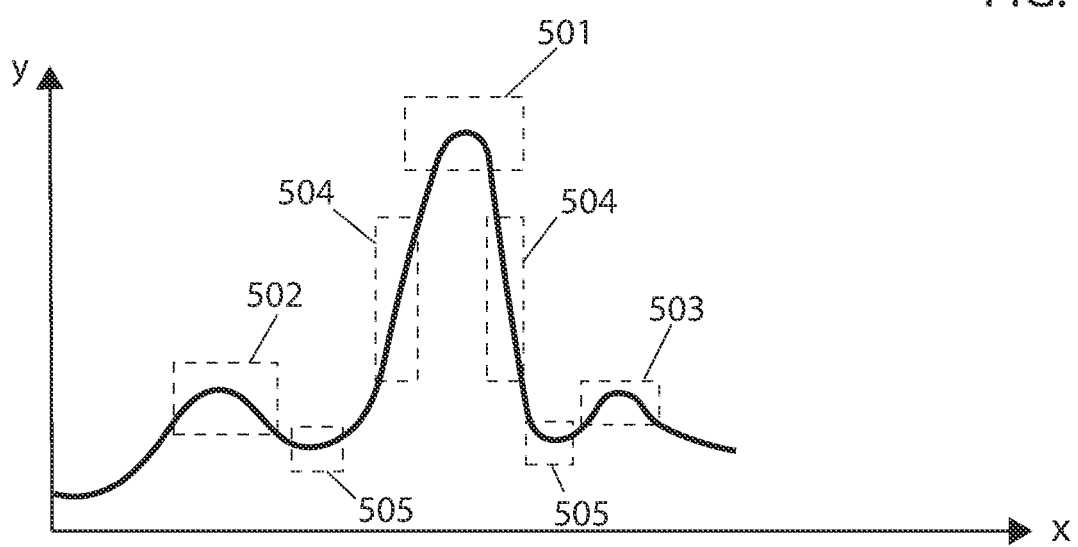

In some embodiments, wherein more than one measurement approach is used or multiple measurement devices are used, localization of the robotic cleaner inferred by the processor has a higher certainty of being correct if readings are in-phase and/or agree with one another. In some embodiments, measurement is referred to as the combination of readings from multiple sensors once processed by the processor. In some embodiments, readings from multiple sensors may disagree and produce imprecise localization by the processor as different readings produce different measurement, thus placing the robotic cleaner at different locations. For example, FIG. 5A illustrates a spike at some value 500 for the position x of the robotic cleaner when readings from multiple sensors for localization are in agreement, wherein the y-axis represents the likelihood that the robotic cleaner is located as some position x. The agreement of readings from multiple sensors results in a sharp maximum as the certainty of the localization at some value 500 for the position x of the robotic cleaner increases from validation of readings from multiple devices. However, in some embodiments it is possible that multiple measurement approaches or readings from multiple sensors disagree wherein measurements or readings from different sensors result in the processor inferring different locations of the robotic cleaner. For example, FIG. 5B illustrates probability distribution for possible values of the position x of the robotic cleaner when readings of two sensors are in disagreement. Area 501 is formed as a result of the majority of readings from the two sensors being in agreement whiles areas 502 and 503 are formed from the readings of the two sensors being in disagreement, with each area corresponding to readings from a different sensor. Values for the position x of the robotic cleaner within area 501 have high probability of being the position x of the robotic cleaner. Values within area 504 have decreased probability of being the position x of the robotic cleaner due to slight disagreement between measurement from readings of the two sensors. Values within areas 503 and 504 are a result of disagreement between the two sensors, wherein area 502 coincides with measurement from readings of one sensor and area 503 coincides with measurement from readings of the other sensor. Values for the position x of the robotic cleaner within areas 505 have low probability of being the position x of the robotic cleaner. In some embodiments, with some processing, the processor eliminates other possibilities such that the probability distribution function collapses to a Dirac Delta function, such as that shown in FIG. 1C. For example, in certain environments readings of some sensors may be considered less accurate than others and may therefore not considered or if the majority of readings from different sensors are in agreement the minority readings in disagreement are not considered or unrealistic readings are eliminated.

Figure 6:
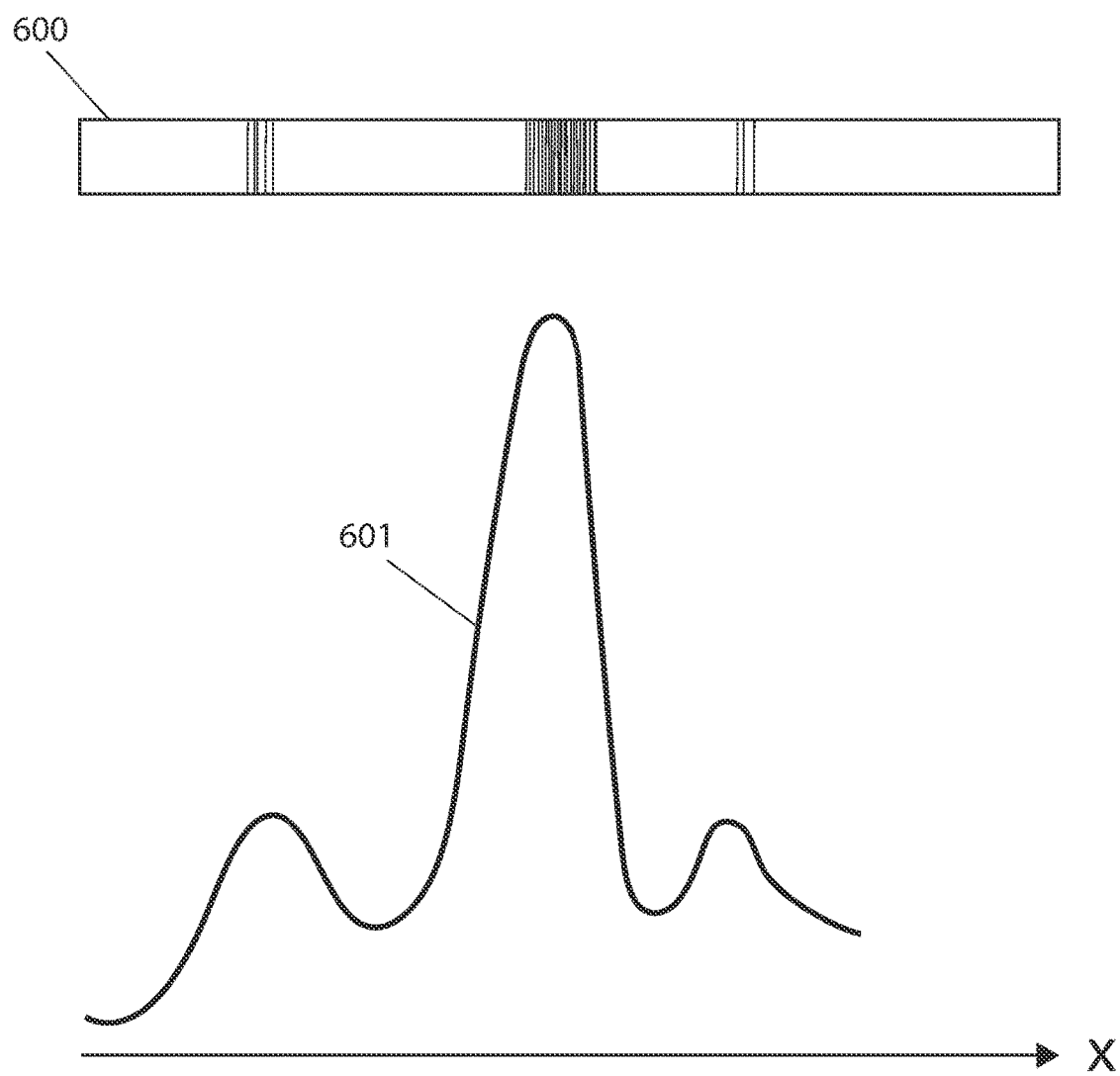
FIG. 6 illustrates an embodiment of discretization of measurements.

In some embodiments, the processor discretizes measurements, as shown in FIG. 6 with discrete representation 600 of possible positions x of the robotic cleaner in graph 601. In some embodiments, the processor compares discrete values against a preprogrammed bias function. In some embodiments, the discretized values that are well matched with the noise and bias that are previously given to the robotic cleaner are given more importance by the processor.

In some embodiments, a second measurement is taken by the same or another sensor of the robotic cleaner and values of the first and the second measurement are compared and combined by the processor to form a more reliable measurement. In some embodiments, the first measurement and second measurement are not of the same kind. For example, a first measurement is derived from an odometer reading and a second measurement is derived from a range finder or a depth camera. In some embodiments, the processor compares the discretized values that are matched against a bias function to determine how they fit with a second discretized function. In processing of the information, as explained in the above embodiments, the measurement that is used is assumed to be accurate enough to localize the robotic cleaner to some location C with a certain resolution.

In between measurements, the robotic cleaner is in a state of superposition as it may only be localized by the processor when a measurement is taken. Therefore, if the system is interpreted as a Copenhagen Interpretation wherein the physical system does not have definite properties prior to being measured and only the probabilities that measurements will produce certain results may be predicted, it may be thought that measurement is what causes the robotic cleaner to be perceived at some location C at a given time or that measurement, in effect, localizes the robotic cleaner. For this reason, preparation and measurement are independent in some embodiments described herein. In some embodiments, preparation includes any action or control that causes the robotic cleaner to take a particular measurement.

For example, preparation includes the robotic cleaner driving to a location wherein a particular measurement is taken or includes a user placing the robotic cleaner or pushing the robotic cleaner to a location wherein a particular measurement is taken. In some embodiments, the robotic cleaner is assumed to be in an eigenstate, the state where the limit of repeated measurements converges to a specific value, when a sensory device of the robotic cleaner takes a measurement of the surroundings. Thus, in some embodiments, preparation puts the system in an eigenstate.

Figure 7:
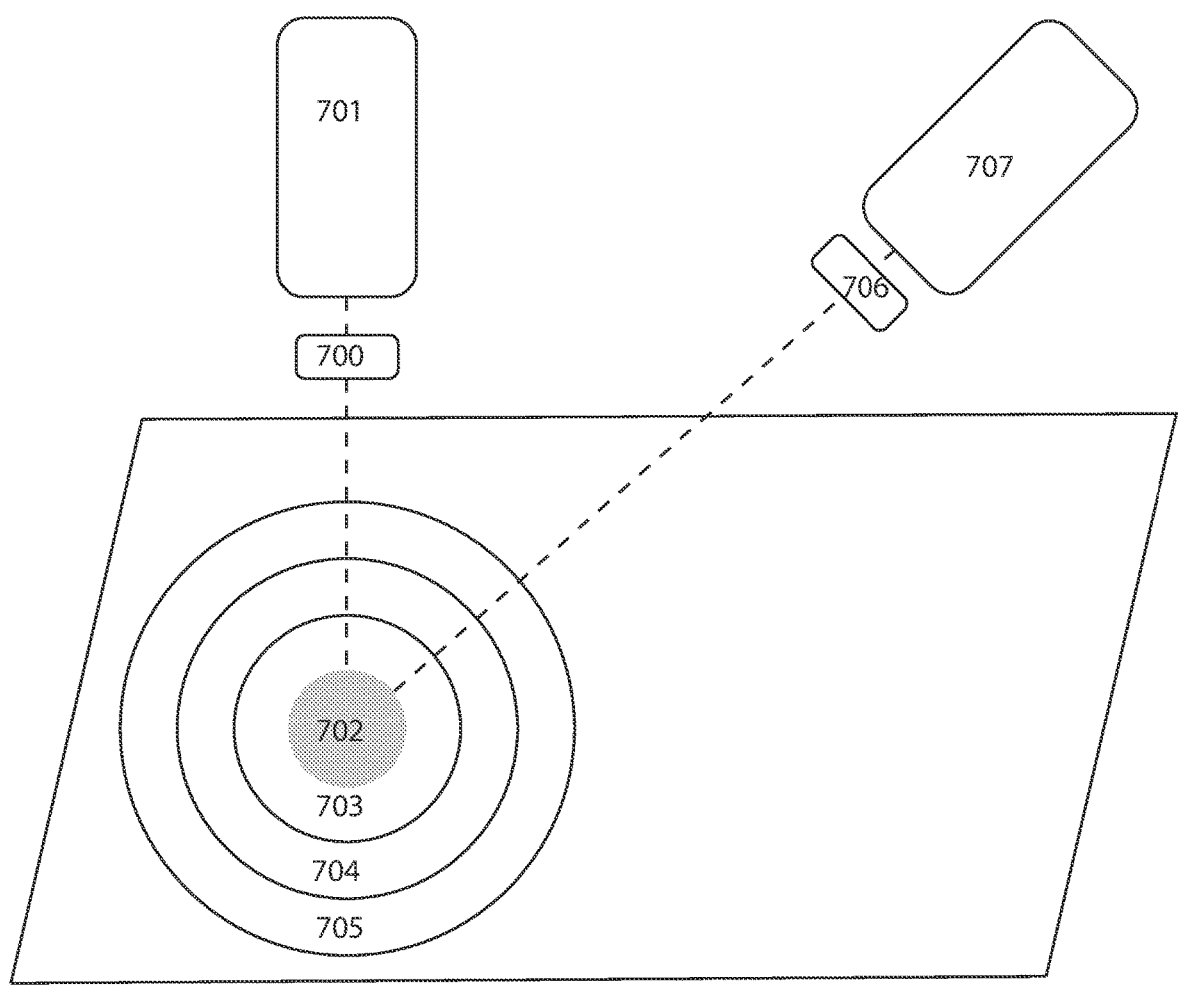
FIG. 7 illustrates an embodiment of preparation of a state.

In some embodiments, the collection of actions and/or controls that cause the robotic cleaner to take the same particular measurement are said to prepare the same state and are referred to as preparation operators. For example, FIG. 7 illustrates robotic cleaner 700 being dropped by a machine or other device through a vertically oriented tube 701 positioned directly above area 702 on driving surface 703. There is a high likelihood that this action will result in the robotic cleaner landing directly below tube 701 in area 702. It is also possible it may land in areas 703, 704 or 705, though with less likelihood the further away the area is from area 702 located directly beneath tube 701. If the action were repeated n times, as n approaches infinity, the limit of the robotic cleaner landing at some area A converges to $$\frac{m}{n},$$

where m is the number of times the robotic cleaner lands in area A. The processor determines this convergence for areas 702, 703, 704 and 705. Based on the results, the area within which the robotic cleaner is most likely located in reality converges to a specific area, the area A with greatest value m. Convergence usually occurs after many repetitions of the same action or experiment. At the beginning of experimentation, observations may not converge. At the beginning of the experiment, results may seem divergent or it may appear that the possibility of the robotic cleaner landing in multiple areas is similar. However, as n increases, the area in which the robotic cleaner is most likely located converges to 702. The processor determines convergence using:

$$P(A|C) = \lim_{n \to \infty} \frac{m}{n}$$

This can be thought of as the propensity of the robotic cleaner landing in area A given condition C, which in this case is the action of the robotic cleaner being released through tube 701, or otherwise the preparation operator. There may exist other preparation operators for the same state. For example, the action of robotic cleaner 706 in FIG. 7 being released through tube 707 angled at 45 degrees with the same set of probabilities of landing in areas 702 through to 705 is said to prepare the same state. In some embodiments, a mathematically equivalent experiment comprising n robotic cleaners dropped at once producing the same results is said to prepare the same state. With the same logic, the limit of the robotic cleaner landing at some area A converges to $$\frac{m}{n},$$

with a greater number of robotic cleaners landing in area 702 as compared to areas 703, 704 and 705. For a robotic cleaner in operation, the processor assumes any actions and/or controls that produce the same results prepare the same state. As an alternative to counting the number of times the robotic cleaner lands in an area A, the processor can apply the convergence in other ways. For example, if the mass of all robotic cleaners were equivalent and each separate area was a weighing scale, the limit of the weight in area A converges as well, where m in this case is the total weight in area A and n is the total weight of all areas combined. The processor determines the number of robotic cleaners in each area by dividing the total weight of an area by the weight of a single robotic cleaner. Given the results of the experiment the processor deduces, for example, that the robotic cleaner lands in area 702. With the different preparations being mathematically equivalent, as n→∞, preparations are considered interchangeable. To visualize n→∞, repeatedly dropping a large number of robotic cleaners a large number of times is envisioned wherein n×n=∞. Given the different possible preparations, the measurement taken remains independent of the preparation or the method by which the robotic cleaner gets to areas 702 through to 705, for example. In operation, the processor calculates convergence or propensity of landing in an area A over time.

In the example provided herein, the probability of the robotic cleaner landing in areas 702 to 705 is discussed. However, the probability of the robotic cleaner being located at very remote areas is not zero as there is always a possibility that the robotic cleaner is located anywhere. However, in some embodiments, the processor of the robotic cleaner compares all possible areas and their corresponding convergence results and eliminates areas with low probabilities, leaving only most intuitive and realistic areas for evaluation.

In some embodiments, having separated measurement and preparation, the processor interprets Ψ discretely. For example, in the case of a vector ket |X> of n linearly independent elements $(x_1, x_2, \ldots, x_n)$ in a Hilbert Space, a preparation vector ket |P> acts on each element of vector ket |X> such that a measurement produces an element in ket |ΨP>, an eigenvector describing all possible eigenstates of the robotic cleaner. Therefore, ket |Ψ> is broken down by the processor to vectors acting on the space vector. Using Bra-Ket notation, the processor uses:

$$|\Psi> = C_1|X> + C_2|P1> + C_3|P2> + \ldots$$

wherein C is an eigenvalue of scalar coefficient stretching the vector in the space. The processor uses this discrete approach to filter out states of the robotic cleaner with low possibility or without any possibility of being true.

By describing localization in a Hilbert Space, localization of the robotic cleaner is not confined to a Cartesian coordinate system. Different sets of vectors are used by the processor in localization of the robotic cleaner whereby each set of vectors that cannot be represented as multiplication of other vectors increases the dimensionality of the system. For example, in some embodiments, the processor localizes the robotic cleaner against a certain type of floor assuming sensors are capable of processing and distinguishing floor types based on the reflection from the emitted light; against a room in which the robotic cleaner may be working wherein the room is represented as a graph of connected nodes; against a certain height measured relative to the floor given different heights are defined in the space; against a certain Wi-Fi strength; against presence or strength of light, sound, people, objects and or any other substance or material;

against the slope of the environment; against the amount of power required by the system assuming different locations require different power, as in case of requiring more power for driving up a slope; and against amp withdrawal. As a further example, the processor localizes the robotic cleaner against an edge at which two walls meet. To do so, the processor first identifies an edge. Using distance-based measurement, the processor uses the sum of squared differences between the distances from each of the two walls to identify the meeting of the two walls, or otherwise their shared edge. Movement along one wall in a direction away from the edge results in a large number. Movement along both walls results in a small number and signifies an edge. In some cases, the processor localizes the robotic cleaner against a corner. Using image-based measurement, the processor runs a sliding window through an image. A shift of the sliding window along the wall results in small changes of intensity while a shift perpendicular to the wall or a corner or isolated point results in large changes. Therefore, the processor identifies a corner or edge when a shift of the sliding window along an image results in large changes in intensity. U.S. patent app. Ser. No. 15/954,410, the entire contents of which are hereby incorporated by reference, describes an embodiment of a method for detecting an edge or corner.

This multi-dimensionality in localization provides robustness that may be useful in various applications. In some embodiments, the processor of the robotic cleaner uses the types of localization described above for controlling the operation, settings, and functionality of the robotic cleaner. For example, the processor uses localization to control the behavior of the robotic cleaner in different areas, where for instance, certain cleaning functions or settings are desired for different environments. These functions or settings may be triggered once the processor has localized the robotic cleaner against the environment. For example, it may be desirable to run the motor at a higher speed when moving over rough surfaces, such as soft flooring as opposed to hardwood, wherein localization against floor type or against a room may trigger the motor speed. As a further example, localization may also be used in controlling the movement of the robotic cleaner. If the processor localizes the robotic cleaner against a boundary, for example, it may choose to select a path along the boundary or it may trigger a polymorphic or other type of path planning algorithm, such as those described in U.S. patent application Ser. Nos. 16/041, 286, 15/406,890, and 14/673,633, the entire contents of which are hereby incorporated by reference. Or, localizing the robotic cleaner against a boundary may trigger a path planning algorithm for cleaning central areas of the environment and, once completed, a wall follow algorithm for cleaning along the boundaries of the environment.

In some cases, the measurements taken provide less information of the observed surroundings than others but do provide to some degree a sense of the surroundings of the robotic cleaner. For example, the sensors of the robotic cleaner take a measurement for which no objects, obstacles, or perimeters exist within the measurement range. Although the measurement device of the robotic cleaner does not measure any objects, obstacles, or perimeters, the processor still gains useful information about its surroundings. It can conclude that there are no objects, obstacles, or perimeters between the robotic cleaner and the maximum measurement range, thereby gaining a sense of the surroundings.

In some embodiments, the processor of the robotic cleaner uses a statistical ensemble to represent multiple possible locations of the robotic cleaner as it moves within the surroundings. In some embodiments, the statistical ensemble collapses to at least one possible location of the robotic cleaner each time a measurement is taken. In some embodiments, the processor evolves the statistical ensemble over time according to an equation of motion of the robotic device. In some embodiments, the equation of motion includes Hamilton's equation.

Figure 8A:
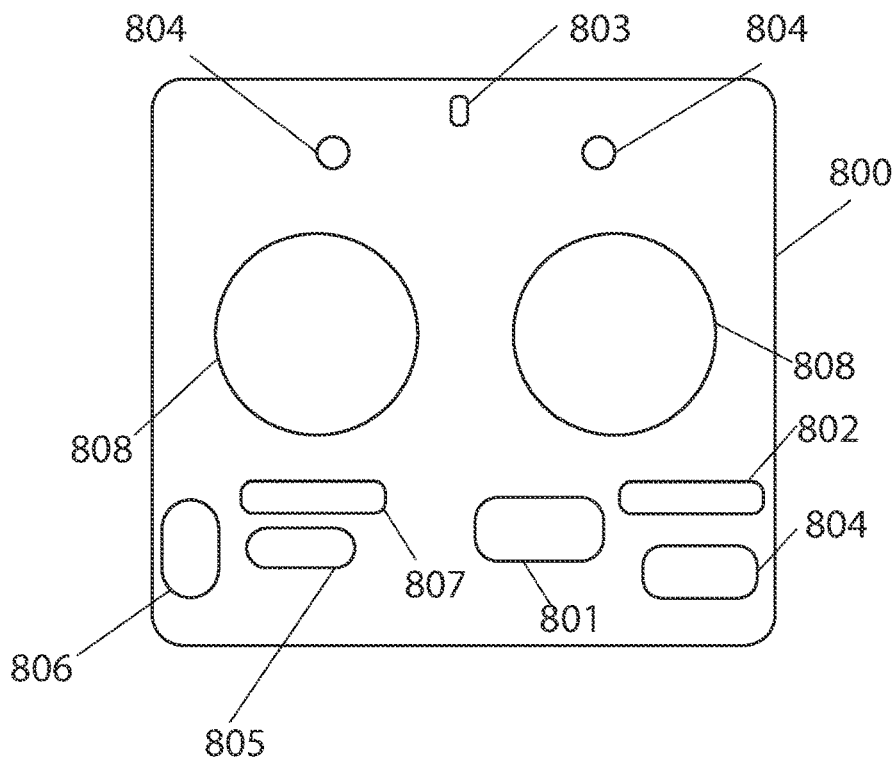
FIGS. 8A and 8B illustrate a schematic diagram of an example of a robotic cleaner for commercial establishments with which the present techniques may be implemented in some embodiments.
Figure 8B:
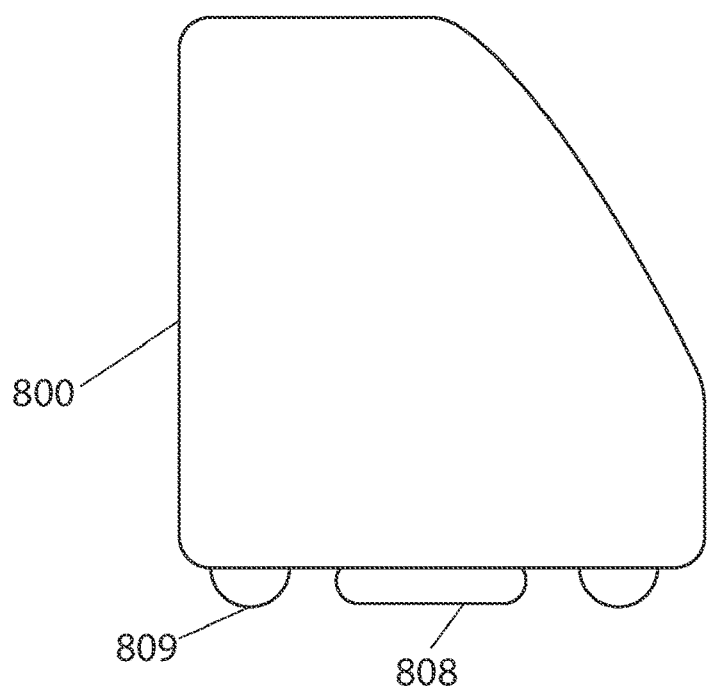

FIG. 8A illustrates a top view of an example of a robotic cleaner 800 with processor 801, memory 802, a measurement device 803, a pair of sensors 804, network communication 805, movement driver 806, timer 807, and circular brush cleaning tools 808. The first and second set of sensors 803 and 804 may include depth measuring devices, movement measuring devices, and the like. In some embodiments, the robotic cleaner may include the features of a robotic cleaner described herein. In some embodiments, program code stored in the memory 802 and executed by the processor 801 may effectuate the operations described herein. FIG. 8B illustrates a side view of the robotic cleaner 800 with wheels 809 and circular brush cleaning tool 808. In some embodiments, the robotic cleaner includes a customizable versatile mobile robotic chassis customized to function as a robotic cleaner. An example of a customizable versatile mobile robotic chassis is described in U.S. patent application Ser. No. 16/230,805, the entire contents of which is hereby incorporated by reference.

Figure 9:
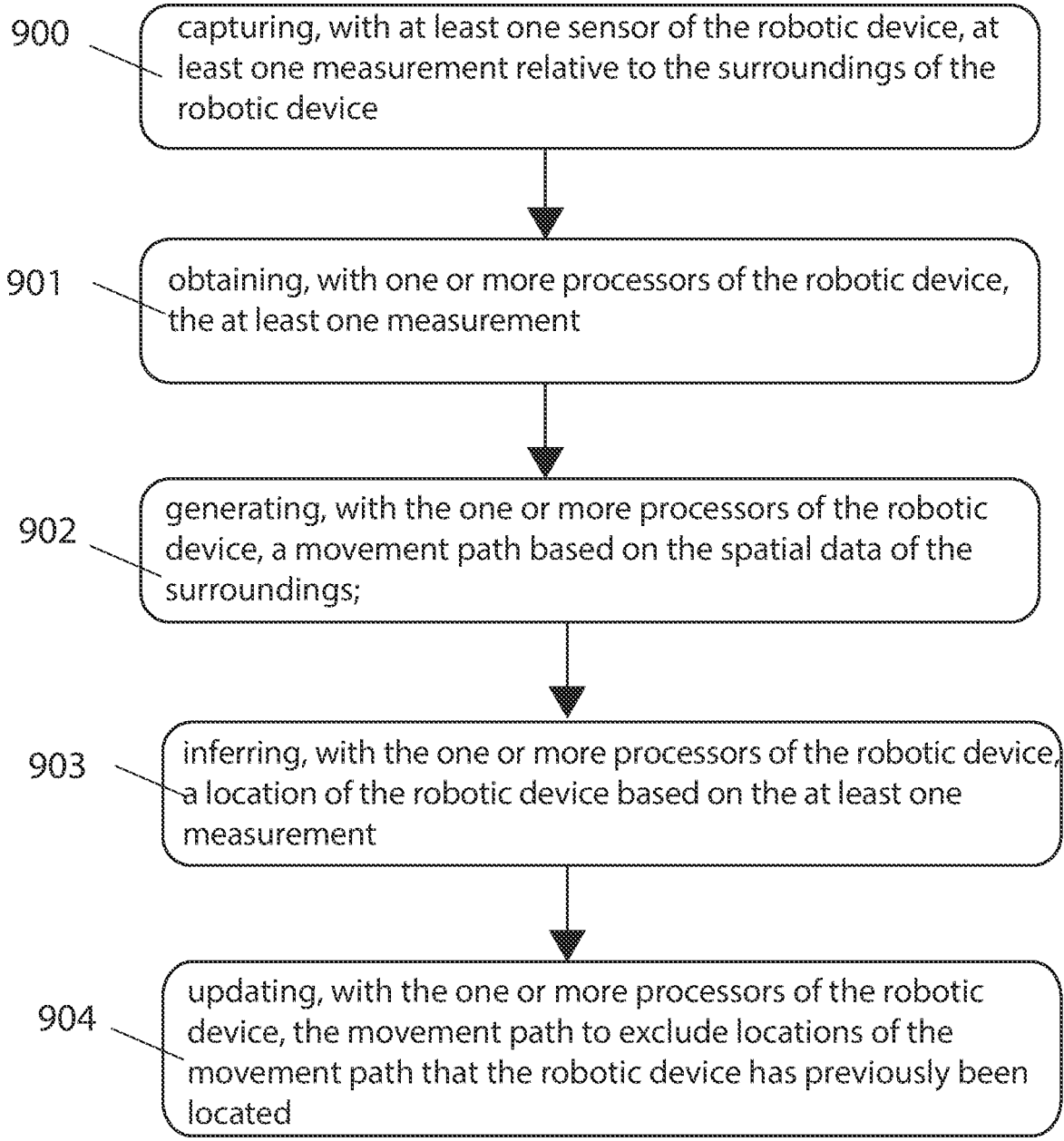
FIG. 9 illustrates a flowchart describing a method for localization of a robotic cleaner according to some embodiments.

FIG. 9 illustrates a flowchart describing embodiments of a robotic cleaner path planning method 900, 901, 902, 903, and 904 corresponding with steps performed in some embodiments. In some embodiments, inferring the location of the robotic device, step 903 in the flowchart, includes determining, with the one or more processors of the robotic device, a probability of the robotic device being located at different possible locations within the surroundings based on the at least one measurement; and inferring, with the one or more processors of the robotic device, the location of the robotic device based on the probability of the robotic device being located at different possible locations within the surroundings, wherein the one or more processor of the robotic device infers the location of the robotic device at intervals of a predetermined travel distance of the robotic device or when the certainty of the location of robotic device is below a predetermined threshold.

While the techniques described herein are applied to an autonomous robotic cleaner for commercial or residential establishments, in other embodiments, the techniques described herein can be applied to other types of semi-autonomous and autonomous robotic devices. For examples, robotic towing devices, robotic food delivery devices, robotic ambulances, robotic transit systems, robotic cars, robotic cooking devices, robotic refuse container, robotic trashcan, robotic transport device, robotic bus, robotic bicycle, robotic train, robotic pet, and the like.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A tangible, non-transitory, machine readable medium storing instructions that when executed by one or more processors of a robotic device effectuate operations comprising:
 capturing, with a camera of the robotic device, spatial data of surroundings of the robotic device;
 generating, with the one or more processors of the robotic device, a movement path based on the spatial data of the surroundings;
 capturing, with at least one sensor of the robotic device, at least one measurement relative to the surroundings of the robotic device;
 obtaining, with the one or more processors of the robotic device, the at least one measurement;
 inferring, with the one or more processors of the robotic device, a location of the robotic device based on the at least one measurement; and
 adjusting, with the one or more processors of the robotic device, a cleaning tool height of a cleaning tool relative to a floor on which the robotic device operates based on a floor type of locations within the surroundings.

2. The medium of claim 1, wherein inferring the location of the robotic device further comprises:
 determining, with the one or more processors of the robotic device, a probability of the robotic device being located at different possible locations within the surroundings based on the at least one measurement;
 inferring, with the one or more processors of the robotic device, the location of the robotic device based on the probability of the robotic device being located at different possible locations within the surroundings,
 wherein the probability of the robotic device being located at the inferred location increases with a number of measurements in agreement.

3. The medium of claim 2, wherein the one or more processors of the robotic device uses a probability density function to determine the probability of the robotic device being located at different possible locations within the surroundings.

4. The medium of claim 2, wherein:
 the one or more processors of the robotic device uses a statistical ensemble to represent multiple possible locations of the robotic device as the robotic device moves within the surroundings; and
 the statistical ensemble reduces to at least one location when the at least one measurement is captured.

5. The medium of claim 2, wherein the one or more processors of the robotic device discards possible locations of the robotic device having a probability below a predetermined threshold.

6. The medium of claim 2, wherein the inferred location of the robotic device is the location with a highest probability of being a true location of the robotic device.

7. The medium of claim 1, wherein the operations further comprise:
 updating, with the one or more processors of the robotic device, the movement path to exclude locations of the movement path that the robotic device has previously been located.

8. The medium of claim 1, wherein the at least one sensor comprises at least one of:
 an imaging device and the at least one measurement comprises visual readings of the surroundings; and
 a depth sensor and the at least one measurement comprises depth readings of the surroundings.

9. The medium of claim 1, wherein the operations further comprise:
 segmenting, with the one or more processors of the robotic device, a map of the surroundings into zones, wherein each zone comprises a plurality of cells that each represent a location within the surroundings.

10. The medium of claim 1, wherein the location of the robotic device is determined in a multi-dimensional space.

11. The medium of claim 1, wherein subsequent measurements are taken within successively increasing search ranges until the one or more processors obtain a measurement that can be used to infer the location of the robotic device.

12. The medium of claim 1, wherein the operations further comprise:
 generating, with the one or more processors of the robotic device, a real-time map of the surroundings by combining the spatial data with newly captured spatial data at overlapping points.

13. The medium of claim 1, wherein the operations further comprise:
 inferring, with the one or more processors of the robotic device, characteristics of the surroundings based on sensor data captured by sensors of the robotic device, wherein:
  the characteristics comprise at least debris accumulation, floor type, and time of user activity; and
  the sensed data is associated with location data of the robotic device indicating a location of the robotic device at the time the sensor data was captured; and
 determining, with the one or more processors of the robotic device, a schedule of the robotic device based on the time of user activity.

14. The medium of claim 13, wherein the operations further comprise:
 determining, with the one or more processors of the robotic device, a movement path of the robotic device based on the debris accumulation in locations within the surroundings.

15. The medium of claim 13, wherein the operations further comprise:
 determining, with the one or more processors of the robotic device, locations to operate a cleaning tool based on the floor type of locations within the surroundings.

16. The medium of claim 13, wherein the operations further comprise at least one of:
 adjusting, with the one or more processors of the robotic device, an intensity of a vacuum based on the time of user activity; and
 adjusting, with the one or more processors of the robotic device, a flow rate of a liquid based on the floor type of locations within the surroundings.

17. The medium of claim 1, wherein the cleaning tool comprises a brush.

18. The medium of claim 1, wherein the robotic device performs work within discovered areas within the surroundings while simultaneously discovering new areas within the surroundings.

19. A method for operating a robotic device, comprising:
capturing, with a camera of the robotic device, spatial data of surroundings of the robotic device;
generating, with one or more processors of the robotic device, a movement path based on the spatial data of the surroundings;
capturing, with at least one sensor of the robotic device, at least one measurement relative to the surroundings of the robotic device;
obtaining, with the one or more processors of the robotic device, the at least one measurement;
inferring, with the one or more processors of the robotic device, a location of the robotic device based on the at least one measurement; and
adjusting, with the one or more processors of the robotic device, a cleaning tool height of a cleaning tool relative to a floor on which the robotic device operates based on a floor type of locations within the surroundings.

20. A robotic device, comprising:
a chassis;
a set of wheels;
one or more motors to drive the set of wheels;
a controller in communication with the one or more motors;
one or more surface cleaning tools;
at least one sensor;
a camera;
one or more processors;
a tangible, non-transitory, machine readable medium storing instructions that when executed by the one or more processors of a robotic device effectuate operations comprising:
capturing, with the camera, spatial data of surroundings of the robotic device;
generating, with the one or more processors, a movement path based on the spatial data of the surroundings;
capturing, with the at least one sensor, at least one measurement relative to the surroundings of the robotic device;
obtaining, with the one or more processors, the at least one measurement;
inferring, with the one or more processors, a location of the robotic device based on the at least one measurement;
inferring, with the one or more processors, characteristics of the surroundings based on sensor data captured by sensors of the robotic device,
wherein:
the characteristics comprise at least debris accumulation, floor type, and time of user activity; and
the sensed data is associated with location data of the robotic device indicating a location of the robotic device at the time the sensor data was captured;
determining, with the one or more processors, a schedule of the robotic device based on the time of user activity inferred;
determining, with the one or more processors, locations to operate a cleaning tool based on the floor type of locations within the surroundings; and
adjusting, with the one or more processors, a cleaning tool height of a cleaning tool relative to a floor on which the robotic device operates based on a floor type of locations within the surroundings.

* * * * *